(12) United States Patent
Beuck

(10) Patent No.: US 7,171,217 B2
(45) Date of Patent: Jan. 30, 2007

(54) LOCATION FINDER

(75) Inventor: David P. Beuck, Allen, TX (US)

(73) Assignee: MCI, LLC, Basking Ridge, NJ (US)

( * ) Notice: Subject to any disclaimer, the term of this patent is extended or adjusted under 35 U.S.C. 154(b) by 226 days.

(21) Appl. No.: 10/761,376

(22) Filed: Jan. 22, 2004

(65) Prior Publication Data

US 2005/0164710 A1    Jul. 28, 2005

(51) Int. Cl.
H04Q 7/20    (2006.01)

(52) U.S. Cl. ............ 455/456.1; 455/456.2; 455/456.3; 455/456.4; 455/456.5; 455/456.6; 455/457; 455/414.2

(58) Field of Classification Search ........ 455/436–444, 455/456.1–457; 370/331–334; 701/207, 701/213–214, 216; 340/988; 342/35.01, 342/0.06, 0.12, 450
See application file for complete search history.

(56) References Cited

U.S. PATENT DOCUMENTS

| | | | |
|---|---|---|---|
| 5,461,390 A | 10/1995 | Hoshen | |
| 5,594,425 A | 1/1997 | Ladner et al. | |
| 5,742,233 A | 4/1998 | Hoffman et al. | |
| 5,982,281 A | 11/1999 | Layson, Jr. | |
| 6,073,013 A * | 6/2000 | Agre et al. | 455/428 |
| 6,639,516 B1* | 10/2003 | Copley | 340/573.4 |
| 6,650,902 B1* | 11/2003 | Richton | 455/456.3 |
| 6,703,936 B2 | 3/2004 | Hill et al. | |
| 6,972,684 B2 | 12/2005 | Copley | |
| 5,627,548 A1 | 9/2006 | Woo et al. | |
| 2002/0000930 A1* | 1/2002 | Crowson et al. | 342/357.1 |
| 2002/0131393 A1* | 9/2002 | Baldridge | 370/343 |
| 2002/0170954 A1* | 11/2002 | Zingher et al. | 235/375 |
| 2002/0176579 A1* | 11/2002 | Deshpande et al. | 380/270 |
| 2003/0054834 A1* | 3/2003 | Gutowski et al. | 455/456 |
| 2004/0122956 A1* | 6/2004 | Myers et al. | 709/228 |
| 2004/0192304 A1* | 9/2004 | Casaccia et al. | 455/435.1 |
| 2004/0203732 A1* | 10/2004 | Brusilovsky et al. | 455/426.1 |
| 2004/0203893 A1* | 10/2004 | Kotzin | 455/456.1 |
| 2005/0085257 A1* | 4/2005 | Laird et al. | 455/550.1 |

* cited by examiner

Primary Examiner—Steve M. D'Agosta (57) ABSTRACT

A system and a method for reporting a location are provided. A location finding device determines whether the location finding device is located within a first distance of a first location or area. When the location finding device determines that the location finding device is not located within the first distance of the first location, the location finding device determines whether a wireless access point is available. When a wireless access point is determined to be available, the location finding device reports information indicative of a location of the location finding device to a server via the wireless access point.

27 Claims, 7 Drawing Sheets

LOCATION FINDER

TECHNICAL FIELD

The invention pertains to wireless networking. In particular, the invention pertains to methods and apparatuses for determining a location and reporting the location via a wireless interface.

BACKGROUND OF THE INVENTION

Many objects are lost or reported missing each year. Further, many children become lost or get abducted, pets are lost, and people suffering from disabilities, such as dementia, may become disoriented and lost.

A small location finder and reporting device that can be attached to people, pets and objects and works with existing network infrastructure is needed to help authorities locate the missing people, pets and objects.

SUMMARY OF THE INVENTION

Systems and methods are provided for reporting a location of a device when the device is not located within a proximity of a particular point or within a particular area.

In a first aspect of the invention, a method of reporting a location is provided. A location finding device determines whether the location finding device is within a first distance of a first location. When the location finding device determines that the location finding device is not within the first distance of the first location, the location finding device determines whether a wireless access point is available. When the wireless access point is available, the location finding device transmits information indicative of a location of the location finding device to a server via the wireless access point.

In a second aspect of the invention, a location finding device is provided. The location finding device includes a wireless transceiver configured to communicate with a wireless access device and a global positioning system receiver configured to receive global positioning system satellite signals. The location finding device is further configured to determine a current location of the location finding device using the received global positioning system satellite signals and report the current location to a server via the wireless transceiver when an absence of signals periodically transmitted from a device is detected by the location finding device.

In a third aspect of the invention, a location finding device is provided. The location finding device includes means for determining whether a location finding device is within a first distance of a specific location or area, means for determining whether a wireless access point is available, and means for reporting information indicative of a location of the location finding device to a database server via the wireless access point.

In a fourth aspect of the invention, a server for receiving information from a locator device is provided. The server includes a database configured to store information associated with a group of users, and a processing device. The processing device is configured to receive a signal transmitted from the locator device associated with a first one of the users, and identify contact information associated with the first user stored in the database.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Exemplary System

Figure 1:
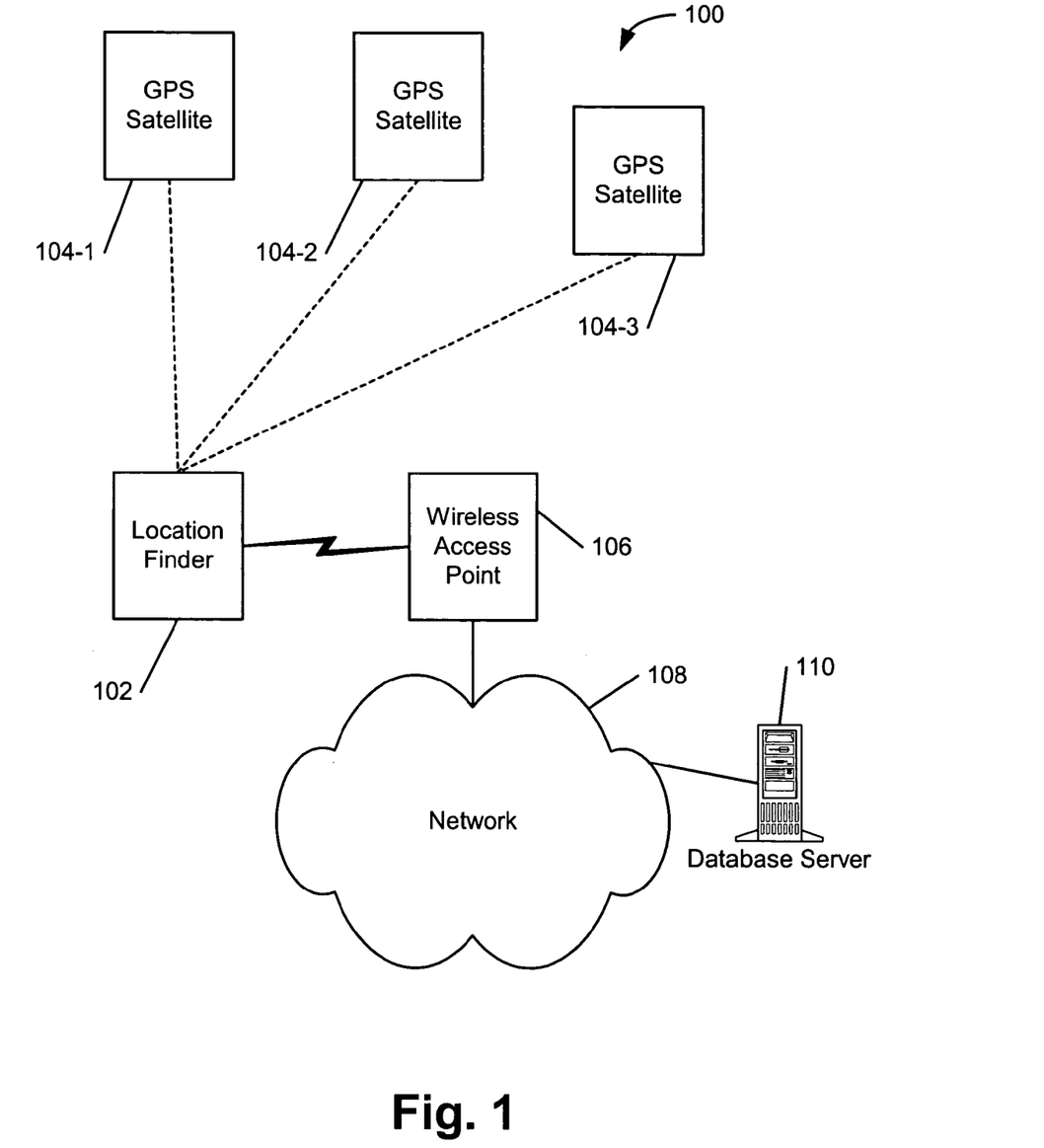
FIG. 1 depicts an exemplary system consistent with the principles of the invention.

FIG. 1 illustrates an exemplary system 100 consistent with the principles of the invention. System 100 includes a location finder 102, Global Positioning System (GPS) satellites 104-1, 104-2, 104-3, a wireless access point 106, a network 108 and a database server 110.

Location finder 102 may receive digital radio signals transmitted by GPS satellites 104-1 through 104-3. The signals may include the satellites' location and the exact time. Location finder 102 may calculate its longitude and latitude by receiving the signals from GPS satellites 104-1 through 104-3 and determining a respective delay from a time each signal is transmitted to a time each respective signal is received at location finder 102. By using a fourth satellite (not shown), altitude may also be calculated.

Wireless Access Point 106 may include an access device for accessing network 108, such as a router that is able to receive and transmit wireless and/or wired signals, or any other device that provides wireless access to a network. Wireless access point 106 may communicate with location finder 102 using one of a number of wireless communication protocols, such as Wi-Fi or Bluetooth. Only a single wireless access point 106 is shown for simplicity. It should be understood that wireless access points 106 are located throughout the country, such as at various restaurants, businesses, etc.

Network 108 may be the Internet, an ad hoc network, a local area network (LAN), a wide area network (WAN), a metropolitan area network (MAN), or any other network or group of connected networks.

Database server 110 may be a computer system, including a database, with access to network 108. Database server 110 may store in formation from a received 911 emergency request message into the database. Database server 110 may also retrieve contact information pertaining to a received 911 emergency request message.

Figure 2:
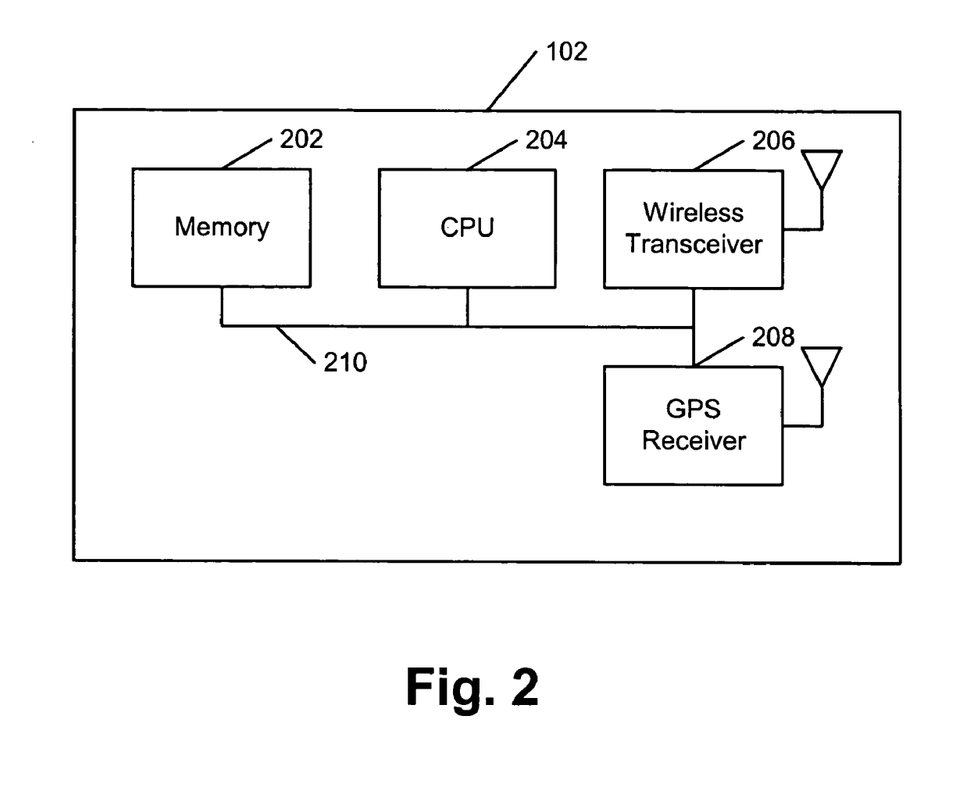
FIG. 2 depicts a functional block diagram of an exemplary location finder of FIG. 1.

FIG. 2 illustrates an exemplary functional block diagram of location finder 102 of FIG. 1. Location finder 102 may include a memory 202, a central processing unit (CPU) 204, a wireless transceiver 206, a GPS receiver 208 and a communications interface 210, such as a bus. Memory 202 may include static memory, such as read only memory (ROM) for storing machine-readable instructions, and dynamic random access memory (DRAM) for working storage. Memory 202 may also include storage devices, such as a floppy disk, CD ROM, CD read/write (R/W) disc, flash memory, as well as other storage devices. CPU 204 may include one or more processors capable of controlling location finder 102. Wireless transceiver 206 may include a transmitter and receiver for communicating with wireless access points 106 via a wireless communications protocol. GPS receiver 208 may include a receiver for receiving signals from GPS satellites 104-1 through 104-3. Communications interface 210 provides an interface among components of location finder 102.

Figure 3:
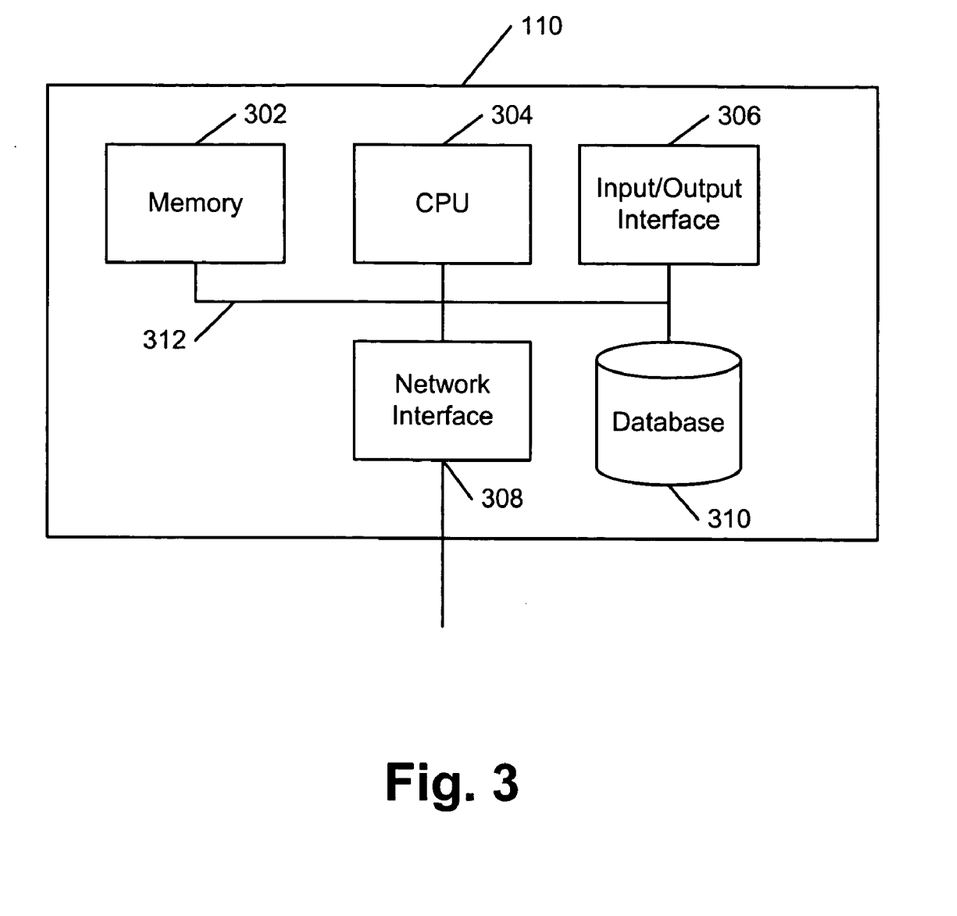
FIG. 3 illustrates a functional block diagram of an exemplary database server of FIG. 1.

FIG. 3 is an exemplary functional block diagram of database server 110 of FIG. 1. Database server 110 may include a memory 302, a CPU 304, an input/output interface 306, a network interface 308, a database 310 and a communications interface 312, such as a bus. Memory 302 may include static memory, such as ROM for holding machine-readable instructions, and DRAM for working storage. Memory 302 may also include storage devices, such as a floppy disk, CD ROM, CD R/W disc, flash memory, as well as other storage devices. CPU 304 may include one or more processors capable of controlling database server 110. Input/output interface 306 may provide an interface to a monitor, such as a CRT, a printer, a keyboard, and/or a mouse. Network interface 308 interfaces database server 110 to network 108 and may include a modem, an Ethernet interface or any other network interface. Database 310 may be a database configured to store information from location finder 102, such as a User ID and GPS coordinates.

Operation of Location Finder

In an implementation consistent with principles of the invention, location finder 102 may periodically receive a "Keep Alive" strobe from a nearby wireless transmitter. The wireless transmitter may be located, for example, in a home or a school. When location finder 102 detects an absence of the "Keep Alive" strobe for at least a predefined period of time, location finder 102 may enter a seek mode in which location finder 102 collects GPS signals from GPS satellites 104-1–104-3, determines a location of location finder 102 based on the collected GPS signals, and determines whether a wireless access point is available. If a wireless access point is available, location finder 102 may send a 911-type request (i.e., an emergency) message to a server, such as database server 110, via the wireless access point.

Figure 4:
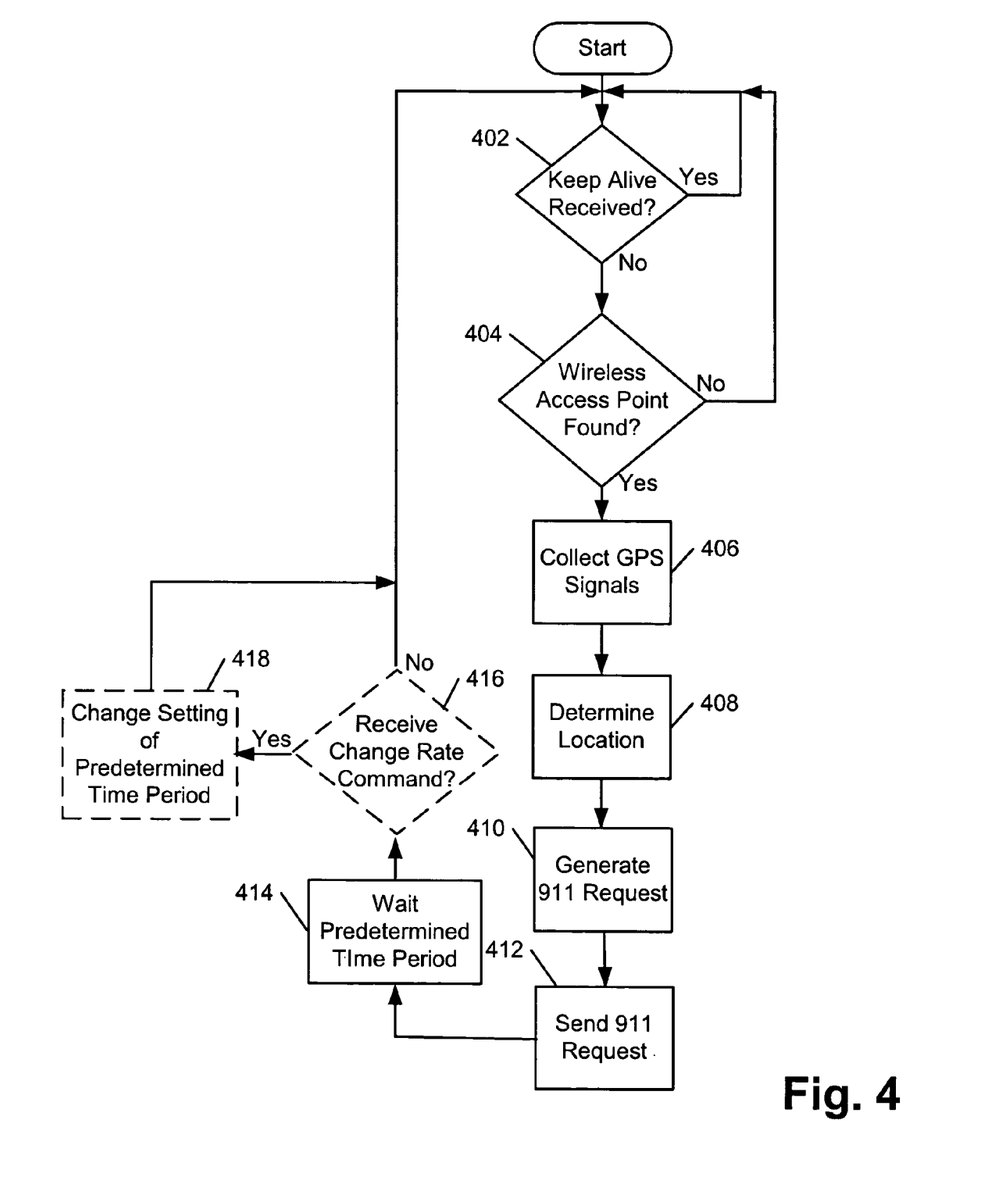
FIG. 4 is a flowchart of an exemplary procedure that may be performed by the location finder of FIG. 1.

FIG. 4 illustrates an exemplary procedure that may be executed by location finder 102. First, location finder 102 may determine whether it has recently received the "Keep Alive" strobe (act 402). If the "Keep Alive" strobe was not detected over a recent predefined interval (e.g., a ten minute period), which may be configurable, then location finder 102 may determine whether wireless access point 106 is available (act 404).

If wireless access point 106 is available then location finder 102 may begin to collect signals from GPS satellites 104-1–104-3 (act 406). Alternatively, location finder 102 may continuously determine its location once the "Keep Alive" strobe is not detected within the predefined interval.

In each case, location finder 102 may determine its location from the signals transmitted from GPS satellites 104-1–104-3 by examining the GPS satellite location information in the signals, the precise time (included in the signals) that the signals were transmitted, and the precise time that the signals reached location finder 102 (act 408).

Location finder 102 may then generate and send a 911 emergency request message (acts 410 and 412). Before generating and sending the 911 emergency request message, if location finder 102 does not already have an address, such as an Internet Protocol (IP) address, location finder 102 may obtain an address, such as an IP address, via the well-known Dynamic Host Configuration Protocol (DHCP) for assigning dynamic IP addresses to devices on a network. After obtaining the address, if necessary, location finder 102 generates and transmits the 911 emergency request message. Location finder 102 may wait an amount of time equal to the predetermined time period (act. 414) before sending an additional 911 emergency request message based on whether the "Keep Alive" strobe was recently received.

Location finder 102 may also receive change rate commands. A change rate command is a command for changing a rate at which location information is sent to database server 110. The change rate command may be sent from database server 110 after receiving a first 911 emergency request from location finder 102 or may be sent by an operator associated with database server 110. If location finder 102 receives a change rate command (act 416), then location finder 102 may change a setting of a predetermined time period that location finder 102 waits between sending 911 emergency requests (act 418). Thus, location finder 102 may send 911 emergency request messages more or less frequently after receiving the change rate command. For example, if a lost person has been abducted, database server 110 may want to increase the rate at which location finder 102 reports its location.

In a variation of the implementation illustrated in FIG. 4, parties responsible for one or more wireless access points 106 may choose to be preferred or first-choice access providers. Wireless access points 106 of preferred or first-choice providers in this variation of the implementation of FIG. 4 may identify themselves to location finder 102 as preferred or first-choice providers by a number of different methods. For example, wireless access point 106 may transmit a special service set identifier (SSID) that is used by preferred providers. In this variation, when location finder 102 determines whether a wireless access point is available (act 404), location finder 102 may first attempt to connect to a preferred provider wireless access point 106 using the preferred provider SSID. If location finder 102 is unable to connect to a wireless access point using the preferred provider SSID, then location finder 102 may attempt to connect to any wireless access point 106 by, for example, selecting a wireless point having a strongest signal.

Figure 5:
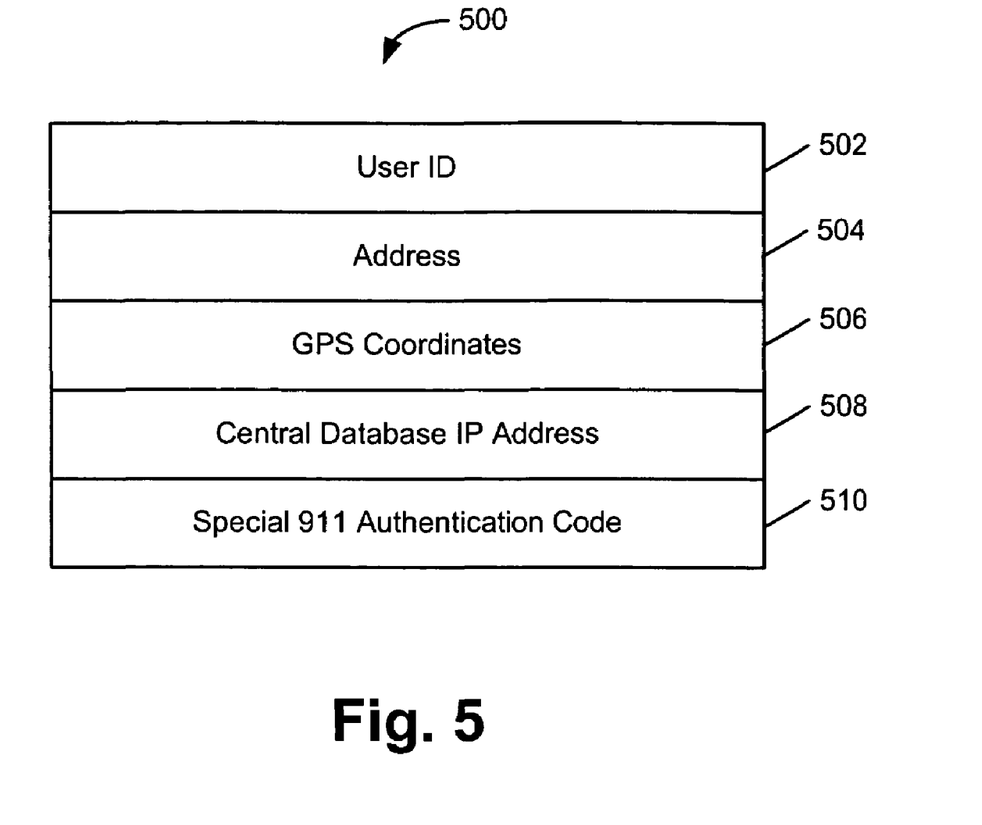
FIG. 5 illustrates an exemplary format of a 911 message that may be sent by the location finder of FIG. 1.

FIG. 5 shows an exemplary 911 emergency request message 500. The 911 emergency request message 500 may include a User ID 502, an address 504, GPS coordinates 506, a central database IP address 508, and a special 911 authentication code 510.

User ID 502 may be a unique ID that can be used to identify a user associated with location finder 102. Database 310 may store these user IDs 502 and information, such as name, telephone number, contact person and other information associated with each user. This information may be used when database server 110 receives a 911 emergency request message. Address 504 may be a Media Access Control (MAC) address or any other address that can be used to identify location finder 102 over a network. GPS coordinates 506 may indicate a location, in longitude and latitude, or any other convenient measurement of location finder 102 determined from information in the GPS signals. Central database IP address 508 may be an IP address or any other type of address associated with database server 110. The Special 911 authentication code 510 may be a predefined code that is recognized by database server 110 to be an emergency call transmitted from location finder 102.

Alternative Implementation

Figure 6:
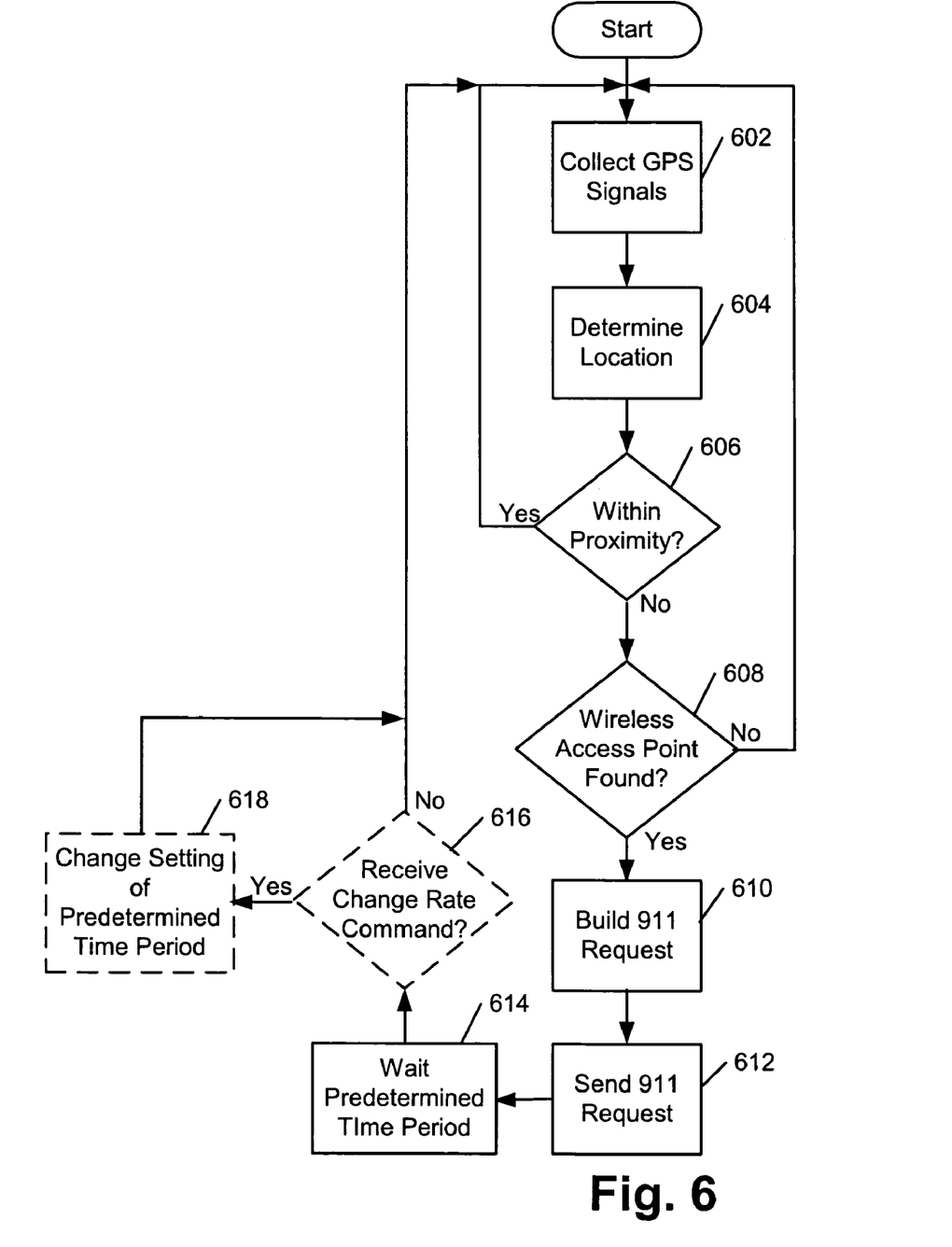
FIG. 6 is a flowchart of a second exemplary procedure that may be performed by the location finder of FIG. 1.

FIG. 6 illustrates an alternative exemplary procedure that may be executed by location finder 102 in an implementation consistent with principles of the invention. This implementation differs from the previous implementation in that location finder 102 may send 911 emergency request messages once location finder 102 determines that it has moved beyond a predetermined distance, for example, one mile from a specific location, such as a school or a home.

According to the exemplary procedure of FIG. 6, location finder 102 collects GPS signals from GPS satellites 104-1–104-3 (act 602) and then determines its location (act 604) in a manner similar to the implementation described with reference to FIG. 4. Location finder 102 then may determine whether it is within a predetermined distance of a specific predefined location (act 606), which may be configurable. If location finder 102 is not within the predetermined distance, location finder 102 then may determine whether it has access to a wireless access point 106 (act 608).

If location finder 102 determines that it has access to wireless access point 106, then location finder 102 may generate and send a 911 emergency request message, such as 911 emergency request message 500 (FIG. 5) to database server 110 (acts 610 and 612). As in the previous implementation, before generating and sending the 911 emergency request message, if location finder 102 does not already have an address, such as an IP address, location finder 102 may obtain an address, such as an IP address via the well-known DHCP for assigning dynamic IP addresses to devices on a network. After generating and sending the 911 emergency request message, location finder 102 may wait an amount of time equal to the predetermined time period (act 614) before sending additional 911 emergency request messages.

Location finder 102 may also receive a change rate command. If location finder 102 receives a change rate command, then location finder 102 may change a setting of a predetermined time period that location finder 102 waits between sending 911 requests (acts 616 and 618). Thus, location finder 102 may send 911 emergency request messages more or less frequently after receiving the change rate command.

In a variation of the implementation illustrated in FIG. 6, parties responsible for one or more wireless access points 106 may choose to be preferred or first-choice access providers. Wireless access points 106 of preferred or first-choice providers in this variation of the implementation of FIG. 6 may identify themselves to location finder 102 as preferred or first-choice providers by a number of different methods. For example, wireless access point 106 may transmit a SSID that is used by preferred providers. In this variation, when location finder 102 determines whether a wireless access point is available (act 608), location finder 102 may first attempt to connect to a preferred provider wireless access point 106 using the preferred provider SSID. If location finder 102 is unable to connect to wireless access point 106 using the preferred provider SSID, then location finder 102 may attempt to connect to any wireless access point 106 by, for example, selecting a wireless point having a strongest signal.

Database Server Processing

Figure 7:
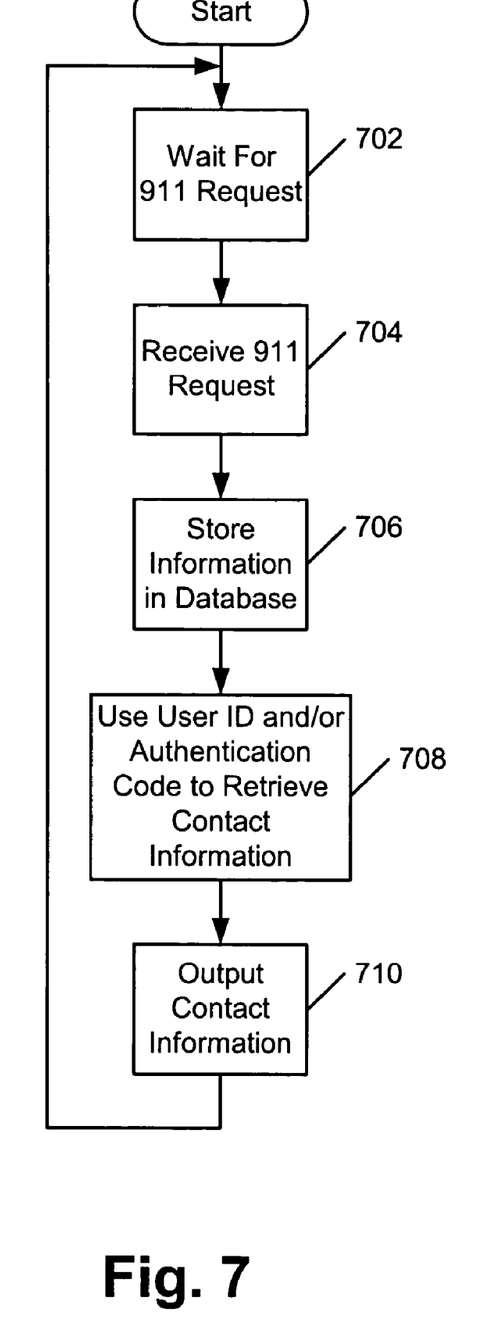
FIG. 7 is a flowchart of an exemplary procedure that may be performed by the database server of FIG. 1.

FIG. 7 illustrates a flowchart of an exemplary procedure for database server 110. First, database server waits to receive 911 emergency request message 500 from location finder 102 (act 702). When location finder 102 sends 911 emergency request message 500 via wireless access point 106, database server 110 receives 911 request message 500 via network 108 (act 704) and may authenticate the received message by examining User ID 502 and special 911 authentication code 510. For example, database server 110 may determine that it has information stored in database 310 associated with User ID 502. Database server 110 then may store information from 911 request message 500, such as user information and GPS coordinates, in central database 310 (act 706). Database server 110 may use User ID 502 and/or special 911 authentication code 510 to retrieve contact information pertaining to the user from a contact database stored in database 310 (act 708). Database server 310 may output the contact information to an output device, such as a display or printer (act 710). Alternatively, the contact information may include, for example, a telephone number, an e-mail address, a pager number, or a facsimile machine phone number. Database server 110 may then, for example, automatically place a telephone call, send an e-mail or a facsimile to a party associated with location finder 102 informing the party of the location of location finder 102. Database server 110 may also be configured to automatically notify other parties, such as the police, based on the particular circumstances.

In a variation of the above implementation of database server 110, database server 110 may determine whether a preferred provider is close to the location of the reporting location finder 102 (for example, within 0.5 miles). Database server 110 may identity a preferred provider by, for example, retrieving information from a preferred provider database to determine whether a preferred provider is close to the reporting location finder 102. Database server 110 may then retrieve contact information regarding the one or more preferred providers from the preferred provider database. The contact information may include a method of contacting the particular preferred providers. For example, the preferred provider contact information may include a voice telephone number, a facsimile telephone number, or an e-mail address. Database server 110 then may automatically place a telephone call, send an e-mail or send a facsimile to the one or more preferred providers informing the one or more preferred providers of the location of location finder 102.

Database server 110, may also send information to the one or more preferred providers regarding information, which database server 110 may retrieve from database 310, associated with reporting location provider 102. The information may include, for example, a description of an object associated with location finder 102 (for example, name of a person, physical description of the person, age, known disabilities). Thus, a nearby preferred provider may begin searching immediately for the object associated with reporting location finder 102.

Further, instead of, or in addition to contacting the preferred providers, database server 110 may send the information associated with reporting location finder 102 to the one or more preferred providers' locally maintained database. The address of a preferred provider's database may be included in database 310 accessible by database server 110.

As described above, location finder 102 may interact with any number of wireless access points 106. Location finder 102 may interact with such wireless access points 106 using conventional wireless protocols, such as those that conform to the IEEE 802.11 protocol. In some situations, networks that conform to current IEEE 802.11 standards may need to be modified to allow for the acceptance and transport of 911 emergency request messages from any source host/entity regardless of any firewalls or other security methods that may be in place.

In addition, when a particular wireless access point 106 is used to transmit a 911 emergency request message, a token monetary payment may be made to the owner of the used wireless access point 106 to compensate for any system impacts and to provide goodwill to the owner of the wireless access point 106.

Embodiments of the invention may be implemented in hardware, software, firmware, or combinations of hardware/software/firmware. In still other embodiments, various acts may be performed manually. Thus, the present invention is not limited to any specific combination of hardware, software and firmware. The firmware may be in a ROM and the software may reside on, for example, a medium such as a floppy disk, optical disk, or CD ROM.

CONCLUSION

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4, 6 and 7, the order of the acts may differ in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   determining whether a location finding device is within a first distance of a first location; and
   when the location finding device is not within the first distance of the first location:
   determining whether a wireless access point is available, and transmitting information indicative of a location of the location finding device to a server via the wireless access point, when the wireless access point is determined to be available;
   determining whether a designated locating party is located within a predefined distance of the location finding device; and
   when the designated locating party is determined to be located within the predefined distance of the location finding device, conveying information associated with the location finding device to the designated locating party to enable the designated locating party to physically search for the location finding device.

2. The method of claim 1, wherein the determining whether a wireless access point is available comprises:
   determining whether a preferred provider wireless access point is available, and
   when the preferred provider wireless access point is determined not to be available, determining whether any wireless access point is available.

3. The method of claim 1, wherein the predefined distance is 0.5 miles.

4. The method of claim 1, wherein the conveying information associated with the location finding device comprises contacting the designated locating party via one of a voice telephone call, a facsimile message, or an e-mail message.

5. The method of claim 1, wherein the conveying information associated with the location finding device comprises transmitting the information associated with the location finding device to a database of the designated locating party.

6. The method of claim 1, further comprising:
   determining the location of the location finding device based on received global positioning system satellite signals.

7. The method of claim 1, wherein the first distance is a distance at which the location finding device can receive a message from a device located at the first location.

8. The method of claim 7, further comprising:
   transmitting the message from the device at predetermined intervals; and
   the determining whether the location finding device is within the first distance comprises determining whether the message was received within a predefined time interval.

9. The method of claim 8, wherein when the location finding device is determined to not be within the first distance and the wireless access point is determined to be available, the method further comprises:
   determining the location of the location finding device based on received global positioning system satellite signals.

10. The method of claim 1, further comprising:
    receiving a command for changing a rate at which information indicative of the location of the location finding device is reported to the server; and
    changing the rate at which the information indicative of the location of the location finding device is reported to the server.

11. The method of claim 1, wherein the determining whether the location finding device is within the first distance of the first location comprises:
    collecting global positioning system satellite signals;
    determining the location of the location finding device based on information included in the global positioning system satellite signals;
    calculating a distance between the location of the location finding device and the first location; and
    comparing the first distance to the calculated distance.

12. A location system comprising:
    a server to store information identifying a party associated with a location finding device, an emergency service provider associated with a current location of the location finding device, and a locating party associated with the location system; and
    a wireless transceiver configured to communicate with a wireless access device; and
    a global positioning system receiver configured to receive global positioning system satellite signals, wherein the location finding device is configured to determine the current location of the location finding device using the received global positioning system satellite signals and report the current location to at least two of the party associated with the location finding device, the emergency service provider, or the locating party using the stored information via the wireless access device when an absence of signals periodically transmitted from a device is detected by the location finding device; and the location finding device is configured to receive an identifier from the wireless access device indicative of a preferred access provider.

13. The location system of claim 12, wherein the location finding device is configured to adjust a frequency of reporting the current information in response to receiving a command to adjust the frequency of reporting.

14. A system comprising:
means for determining whether a location finding device is within a first distance of a specific location or area;
means for determining whether a wireless access point is available to the location finding device;
means for receiving, at the location finding device, an identifier from the wireless access point indicative of a preferred access provider;
means for reporting information indicative of a location of the location finding device to a database server via the wireless access point;
means for storing, at the database server, contact information for a party associated with the location finding device; and
means for generating, at the database server, a notification reporting the location using the contact information.

15. The system of claim 14, wherein the means for receiving the identifier from the wireless access point comprises means for receiving a special service set identifier (SSID).

16. The system of claim 14, wherein the means for determining whether the location finding device is within the first distance comprises:
means for collecting global positioning system satellite signals;
means for determining the location of the location finding device based on information included in the global positioning system satellite signals;
means for calculating a distance between the location of the location finding device and the specific location or area; and
means for comparing the first distance to the calculated distance.

17. The system of claim 14, wherein the means for determining whether the location finding device is within the first distance comprises:
means for receiving a message transmitted from a device at predetermined intervals; and
means for determining whether the message was received within a predetermined time interval.

18. The system of claim 14, further comprising:
means for adjusting a rate at which the means for reporting reports information indicative of the location of the location finding device to the database server.

19. The system of claim 18, wherein the means for adjusting the rate is configured to adjust the rate in response to the location finding device receiving a command for adjusting the rate.

20. A server comprising:
a database configured to store information associated with a plurality of users of locator devices, the information including contact information and a physical descriptor associated with each of the users, and information associated with a plurality of designated locating parties; and
a processing device configured to:
receive a signal from a locator device associated with a first one of the users,
identify contact information and a physical descriptor associated with the first user and stored in the database,
determine, using the stored information associated with the designated locating parties, a designated locating party that is nearest to a location of the locator device based on the received signal, and
convey the identified contact information and the identified physical descriptor associated with the first user to the nearest designated locating party.

21. The server of claim 20, wherein the processing device is further configured to contact the nearest designated locating party via at least one of a voice telephone call, a facsimile message, or an e-mail.

22. The server of claim 20, the processing device being further configured to transmit the physical descriptor for the first user to a database of the nearest designated locating party.

23. The server of claim 20, further comprising:
a network interface configured to connect the server to a network, wherein
the server is configured to send a command to the locator device to change a rate of reporting of the locator device to the database server.

24. The server of claim 20, wherein the processing device is further configured to transmit at least one of an e-mail, a pager message, or a facsimile message based on the contact information and in response to the received signal.

25. The server of claim 20, wherein the processing device is further configured to make a telephone call based on the contact information.

26. The server of claim 20, wherein the signal includes location information identifying a location of the locator device.

27. The server of claim 26, wherein the signal represents an emergency request message.

* * * * *